(12) United States Patent
Joshi et al.

(10) Patent No.: US 9,934,080 B2
(45) Date of Patent: Apr. 3, 2018

(54) SYSTEMS AND METHODS FOR REPORTING AIR MOVER EVENTS TO AN OPERATING SYSTEM DURING OPERATING SYSTEM RUNTIME

(71) Applicant: Dell Products L.P., Round Rock, TX (US)

(72) Inventors: Anand Joshi, Round Rock, TX (US); Balasingh Samuel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 412 days.

(21) Appl. No.: 14/171,252

(22) Filed: Feb. 3, 2014

(65) Prior Publication Data

US 2015/0220088 A1  Aug. 6, 2015

(51) Int. Cl.
| | |
|---|---|
| G06F 11/00 | (2006.01) |
| G06F 11/30 | (2006.01) |
| G06F 1/20 | (2006.01) |
| G06F 11/07 | (2006.01) |

(52) U.S. Cl.
CPC .......... *G06F 11/00* (2013.01); *G06F 11/0706* (2013.01); *G06F 11/0784* (2013.01); *G06F 11/30* (2013.01); *G06F 1/20* (2013.01)

(58) Field of Classification Search
CPC . G06F 11/00; G06F 11/30; G06F 1/20; G06F 11/00706; G06F 11/0784
See application file for complete search history.

(56) References Cited

U.S. PATENT DOCUMENTS

| | | | | |
|---|---|---|---|---|
| 6,438,622 B1 * | 8/2002 | Haghighi | .............. | G06F 1/1632 710/1 |
| 6,553,416 B1 * | 4/2003 | Chari | ................. | H04L 41/0213 709/202 |
| 8,230,446 B2 * | 7/2012 | McKenney | ........... | G06F 9/4812 714/48 |
| 2002/0042896 A1 * | 4/2002 | Johnson | .................... | G06F 1/26 714/47.2 |
| 2003/0121642 A1 * | 7/2003 | Thompson | ................ | H04L 1/22 165/80.2 |
| 2004/0078682 A1 * | 4/2004 | Huang | ................ | G06F 11/0748 714/37 |
| 2008/0104453 A1 * | 5/2008 | Mukherjee | .......... | G06F 11/0724 714/47.3 |

(Continued)

*Primary Examiner* — Charles E Anya
(74) *Attorney, Agent, or Firm* — Jackson Walker L.L.P.

(57) ABSTRACT

In accordance with embodiments of the present disclosure, an information handling system may include a processor, a controller, a driver, and a basic/input output system. The controller may be associated with an air mover and configured to generate an interrupt responsive to an event associated with the air mover. The driver may be embodied in an operating system configured for execution on the processor, the driver configured to, during a runtime execution of the operating system in which the event occurred, receive at least one of the interrupt from the controller or an indication of the interrupt from a basic input/output system. The basic input/output system may comprise a program of instructions executable by the processor and configured to cause the processor to, responsive to the event, receive air mover data from the air mover, and communicate the air mover data to the driver.

20 Claims, 2 Drawing Sheets

(56) References Cited

U.S. PATENT DOCUMENTS

| | | | |
|---|---|---|---|
| 2009/0155045 A1* | 6/2009 | Chang | F01P 7/04 |
| | | | 415/17 |
| 2009/0278679 A1* | 11/2009 | Dailey | G06F 9/542 |
| | | | 340/500 |
| 2011/0290894 A1* | 12/2011 | Dufresne, II | G06F 1/20 |
| | | | 236/49.3 |
| 2013/0037250 A1* | 2/2013 | Franz | F04D 27/004 |
| | | | 165/200 |
| 2013/0130610 A1* | 5/2013 | Unno | G06F 1/20 |
| | | | 454/184 |
| 2014/0257828 A1* | 9/2014 | Thornley | G06F 11/00 |
| | | | 705/2 |
| 2015/0186233 A1* | 7/2015 | Young | G06F 11/366 |
| | | | 714/38.14 |

* cited by examiner

SYSTEMS AND METHODS FOR REPORTING AIR MOVER EVENTS TO AN OPERATING SYSTEM DURING OPERATING SYSTEM RUNTIME

TECHNICAL FIELD

The present disclosure relates in general to information handling systems, and more particularly to reporting events related to an air mover to an operating system of an information handling system having the air mover during runtime of the operating system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

In existing information handling systems, there is typically no mechanism available for embedded controllers or a basic input/output system to proactively deliver messages regarding statuses of air movers (e.g., fans, blowers) to an operating system during runtime of the operating system. For example, when an air mover failure occurs, an automatic shutdown may occur to prevent component damage from overheating. However, a user is typically not notified of such failure when it occurs, and instead may not learn of such until a subsequent boot of the information handling system when the basic input/output system reports a fan failure during power on/self test. In order for the operating system to have any awareness of a fan failure during runtime, a management application would need to regularly poll the basic input/output system, which may not be an effective solution as it may require the use of interrupts, which may negatively affect information handling system performance.

SUMMARY

In accordance with the teachings of the present disclosure, the disadvantages and problems associated with reporting air mover events have been reduced or eliminated.

In accordance with embodiments of the present disclosure, an information handling system may include a processor, a controller, a driver, and a basic/input output system. The controller may be associated with an air mover and configured to generate an interrupt responsive to an event associated with the air mover. The driver may be embodied in an operating system configured for execution on the processor, the driver configured to, during a runtime execution of the operating system in which the event occurred, receive at least one of the interrupt from the controller or an indication of the interrupt from a basic input/output system. The basic input/output system may comprise a program of instructions executable by the processor and configured to cause the processor to, responsive to the event, receive air mover data from the air mover, and communicate the air mover data to the driver.

In accordance with these and other embodiments of the present disclosure, a method may include generating, by a controller associated with an air mover integral to an information handling system, an interrupt responsive to an event associated with the air mover. The method may also include receiving, by a driver embodied in an operating system configured for execution on a processor of the information handling system, at least one of the interrupt from the controller or an indication of the interrupt from a basic input/output system during a runtime execution of the operating system in which the event occurred. The method may further comprise receiving, by the basic input/output system, air mover data responsive to the event. The method may additionally include communicating the air mover data to the driver from the basic input/output system.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
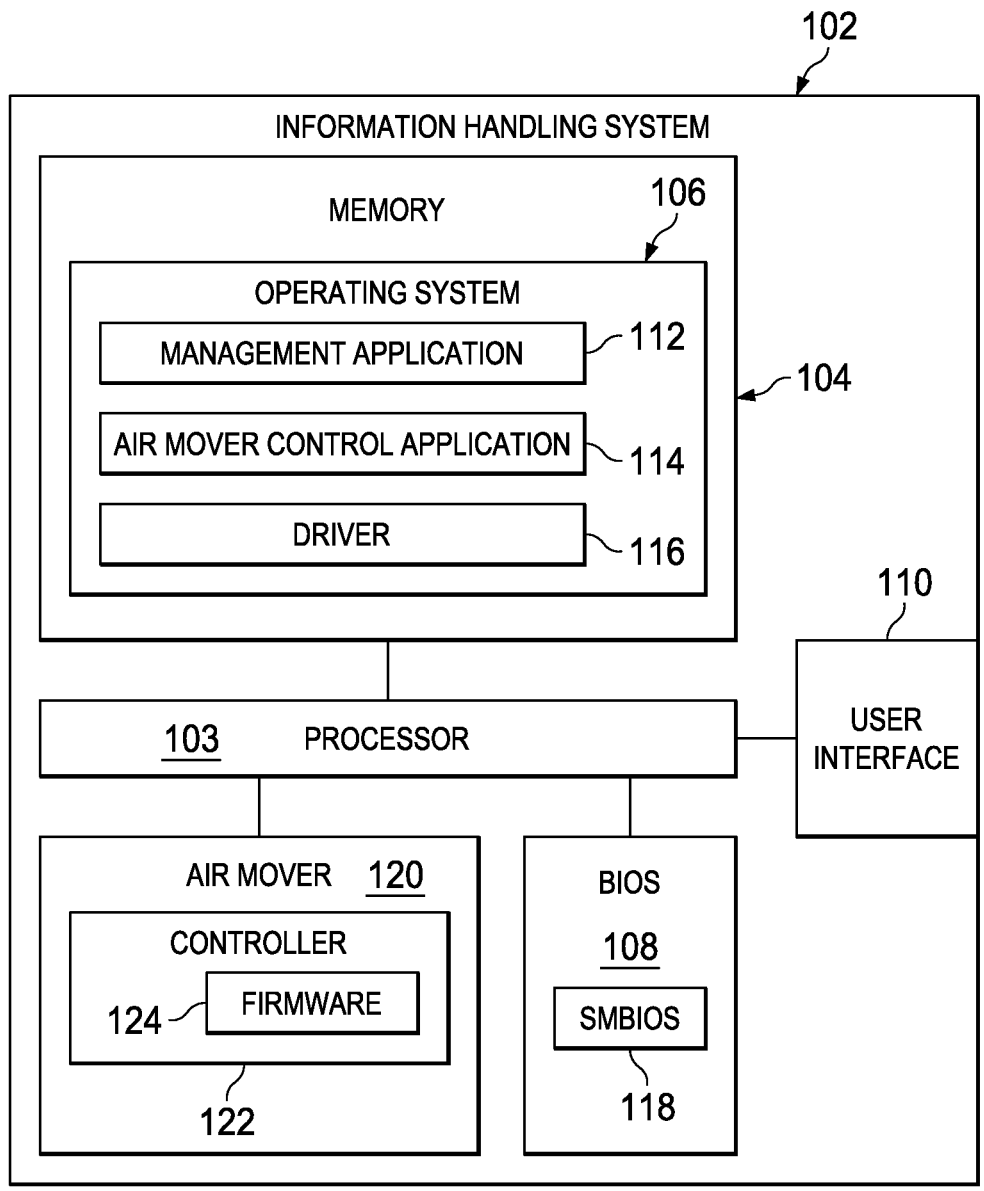
FIG. 1 illustrates a block diagram of an example information handling system adapted for runtime notification of air mover events to an operating system, in accordance with certain embodiments of the present disclosure.
Figure 2:
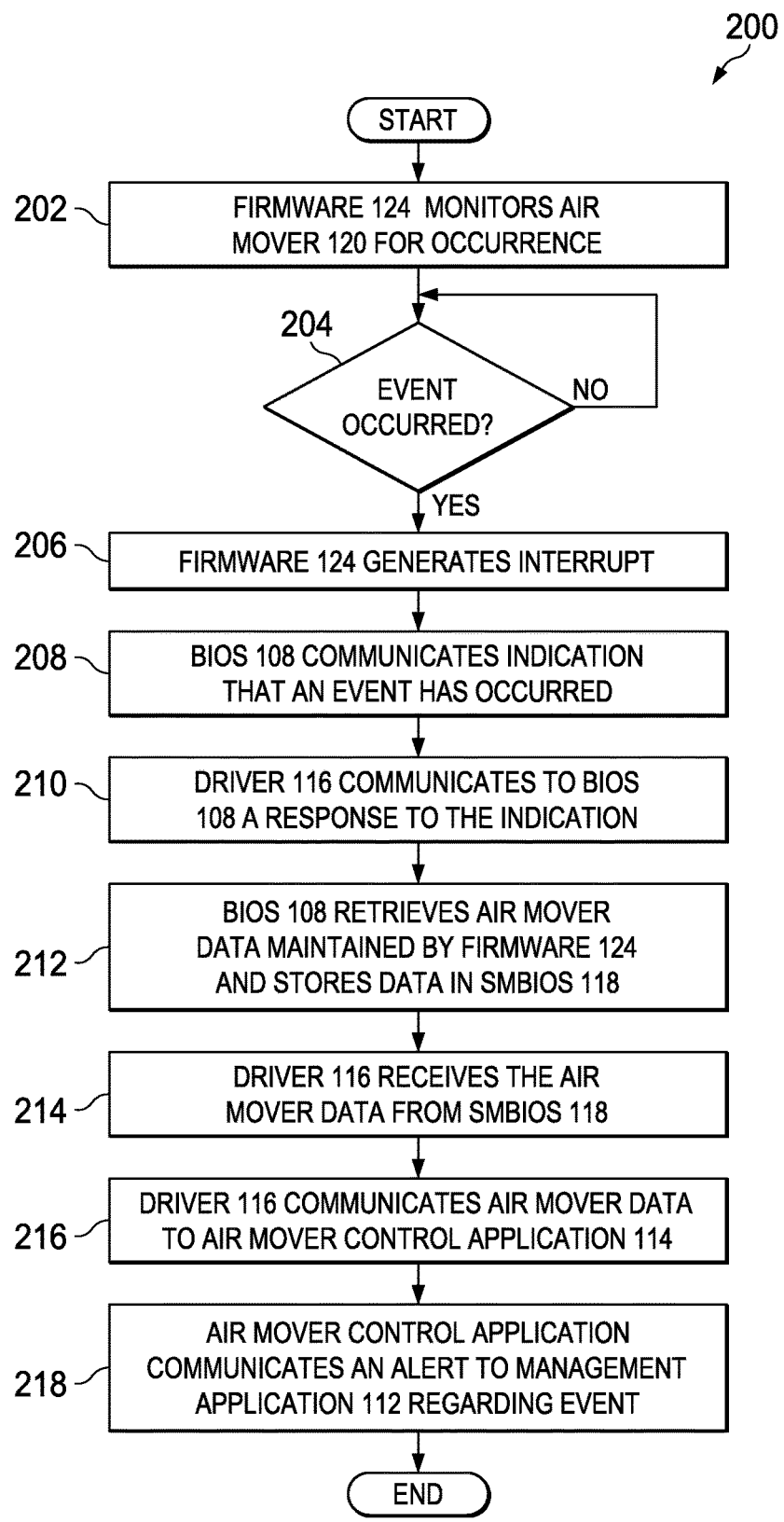
FIG. 2 illustrates a flow chart of an example method for runtime notification of air mover events to an operating system, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102 adapted for runtime notification of air mover events to an operating system, in accordance with certain embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a basic input/output system (BIOS) 108 communicatively coupled to processor 103, a user interface 110 communicatively coupled to processor 103, and an air mover 120 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, BIOS 108, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have operating system 106 stored thereon. Operating system 106 may be any program of executable instructions, or aggregation of programs of executable instructions, configured to manage and/or control the allocation and usage of hardware resources (e.g., processor 103, memory 104, user interface 110, and/or other information handling resources) and provide an interface between such hardware resources and application programs hosted by operating system 106, and thus may act as a host for application programs to be executed by information handling system 102. Active portions of operating system 106 may be read and executed by processor 103 in order to carry out the functionality of operating system 106. Examples of operating system 106 may include, without limitation, Windows, MacOS, UNIX, LINUX, Android, iOS, or any other closed or open source operating system.

As depicted in FIG. 1, operating system 106 may include a management application 112, an air mover control application 114, and a driver 116. Management application 112 may comprise any program of instructions configured to, when read and executed by processor 103, facilitate user management of information handling system 102 and its component information handling resources. For example, management application 112 may comprise and/or may have functionality similar to that of OpenManage Client Instrumentation (OMCI) and/or Dell Power Manager (DPM), each of which is available from Dell Inc. In operation, management application 112 may, when read and executed by processor 103, communicate with user interface 110 to receive control instructions from a user and/or report information to a user.

Air mover control application 114 may comprise any program of instructions configured to, when read and executed by processor 103, facilitate management of air mover 120, as described in greater detail herein.

Driver 116 may comprise a program of instructions configured to, read and executed by processor 103 provide an interface between operating system 106 and one or both of basic input/output system (BIOS) 108 and firmware 124 executing on air mover 120. As described in greater detail below, driver 116 may receive notifications of air mover events from one or both of BIOS 108 and firmware 124 executing on air mover 120, and further communicate notifications of such air mover events to air mover control application 114 and/or management application 112, thus permitting runtime reporting of air mover events to operating system 106. In some embodiments, driver 116 may comprise an Advanced Configuration and Power Interface (ACPI) driver.

BIOS 108 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 108 may be implemented as a program of instructions that may be read by and executed on processor 103 to carry out the functionality of BIOS 108. In these and other embodiments, BIOS 108 may comprise boot firmware configured to be the first code executed by processor 103 when information handling system 102 is booted and/or powered on. As part of its initialization functionality, code for BIOS 108 may be configured to set components of information handling system 102 into a known state, so that one or more applications (e.g., operating system 106 or other application programs) stored on compatible media (e.g., memory 104) may be executed by processor 103 and given control of information handling system 102.

In addition, BIOS 108 may be configured to communicate with driver 116 to facilitate communication to operating system 106 (e.g., via drivers capable of interfacing with BIOS 108) of messages and events associated with information handling resources of information handling system 102 in which BIOS 108 is in communication.

As shown in FIG. 1, BIOS 108 may include system Management BIOS (SMBIOS) 118. SMBIOS 118 may comprise a memory or other computer-readable media including data structures that may be accessed by operating system 106 (e.g., via Windows Management Instrumentation) or BIOS 108 (e.g., via a SmbiosView application) in accordance with the industry-standard SMBIOS specification.

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

Air mover 120 may be communicatively coupled to processor 103, and may include any mechanical or electro-mechanical system, apparatus, or device operable to move air and/or other gasses. In some embodiments, air mover 120 may comprise a fan (e.g., a rotating arrangement of vanes or blades which act on the air). In other embodiments, air mover 120 may comprise a blower (e.g., a centrifugal fan that employs rotating impellers to accelerate air received at its intake and change the direction of the airflow). In these and other embodiments, rotating and other moving components of air mover 120 may be driven by a motor. The rotational speed of such motor may be controlled by suitable control signals communicated from a controller 122 of air mover 120. In operation, air mover 120 may cool information handling resources of information handling system 102 by drawing cool air into an enclosure housing the information handling resources from the outside of the housing, expel warm air from inside the enclosure to the outside of such enclosure, and/or move air across one or more heat-sinks (not explicitly shown) internal to the enclosure to cool one or more information handling resources.

As shown in FIG. 1, air mover 120 may comprise a controller 122. Controller 122 may comprise any system, device, or apparatus configured to, under the direction of firmware 124 executing thereon, control an air flow delivered by air mover 120 based on appropriate control signals received from sensors (e.g., temperature sensors). In these and other embodiments, controller 122 may also be configured to, under direction of firmware 124, monitor events occurring at air mover 120, including without limitation events relating to the health of air mover 120 that may be indicative of an imminent or actual failure of air mover 120, and communicate such events to driver 116 (e.g., via system control interrupt) or to BIOS 108 via ACPI interrupt.

In addition to processor 103, memory 104, BIOS 108, user interface 110, and air mover 120, information handling system 102 may include one or more other information handling resources.

FIG. 2 illustrates a flow chart of an example method 200 for runtime notification of air mover events to an operating system, in accordance with certain embodiments of the present disclosure. According to one embodiment, method 200 may begin at step 202. As noted above, teachings of the present disclosure may be implemented in a variety of configurations of information handling system 102.

At step 202, firmware 124 may monitor air mover 120 for the occurrence of events, including without limitation events related to the health or functionality of air mover 120. At step 204, firmware 124 may determine whether an event has occurred (e.g., change in air mover health). In some embodiments, events may be defined by an administrator or user of information handling system 102 (e.g., a user may set thresholds of parameters for triggering an event, in which such parameters are indicative of fan health). If an event has occurred, method 200 may proceed to step 206. Otherwise, step 204 may repeat until an event occurs.

At step 206, in response to the event, firmware 124 may generate an interrupt. In some embodiments, such interrupt may be an interrupt that may be processed by driver 116 (e.g., a system control interrupt). In other embodiments, such interrupt may be an interrupt that may be processed by BIOS 108 (e.g., an ACPI interrupt).

At step 208, in response to an interrupt from firmware 124, BIOS 108 may communicate an indication to driver 116 that an event has occurred. In some embodiments, such indication may comprise a notification to driver 116 that a Windows Management Instrumentation (WMI) event has occurred.

At step 210, driver 116 may communicate to BIOS 108 a response to the indication. At step 212, in response to the response from driver 116, BIOS 108 may retrieve air mover data maintained by firmware 124 and store such data in SMBIOS 118. At step 214, driver 116 may receive the air mover data from SMBIOS 118. In some embodiments, air mover data may be communicated to driver 116 via ACPI (e.g., an ACPI scripting language method).

At step 216, driver 116 may communicate the air mover data to air mover control application 114. Based on system policy, air mover control application 114 may take an action in response to the event. For example, in some embodiments, air mover control application 114 may, in response to certain events and/or based on particular air mover data, shut down information handling system 102 and/or provide an alert to a user of information handling system 102 of the event or imminent shutdown. At step 218, air mover control application 114 may communicate an alert to management application 112, such that an information technology administrator may be made aware of the event.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system for processing air mover events comprising:
    a processor;
    an air mover including:
        an air mover controller; and
        air mover firmware comprising firmware instructions, executable by the air mover controller;
    a computer readable medium including processor-executable operating system instructions corresponding to an operating system for controlling allocation and usage of one or more information handling resources, wherein said operating system includes one or more drivers including a first driver providing an operating system interface for the air mover firmware;
    a basic input/output system (BIOS) including BIOS instructions executable by the processor, the BIOS instructions including:
        boot firmware to configure the information handling system to a known state; and
        driver communication instructions configured to enable the BIOS to communicate with the one or more drivers;
    wherein the information handling system is configured to perform operations including:
        booting the information handling system to initialize the information handling system and establish a runtime execution of the operating system; and
        within the runtime execution of the operating system, performing interrupt handling operations comprising:
            detecting, with the air mover firmware executing on the air mover controller of the air mover integral to the information handling system, an event associated with a state or functionality of the air mover, wherein the detecting includes consulting a particular threshold to determine whether a number of events has occurred;
            responsive to the detecting, by the air mover firmware, the event, generating, by the air mover firmware, an interrupt corresponding to the event;
            providing an indication of the interrupt to the first driver;
            sending a response to said indication to the BIOS;
            obtaining, by the BIOS, air mover data maintained by the air mover firmware;
            communicating the air mover data from the BIOS to the first driver; and
            communicating the air mover data to an air mover control application program configured to take an action in accordance with the event.

2. The information handling system of claim 1, wherein the interrupt comprises a system control interrupt.

3. The information handling system of claim 1, wherein the event comprises a Windows Management Instrumentation event.

4. The information handling system of claim 1, wherein the air mover controller is configured to communicate the interrupt to the BIOS.

5. The information handling system of claim 4, wherein the interrupt is an Advanced Configuration and Power Interface interrupt.

6. The information handling system of claim 1, wherein the interrupt handling operations include:
    sending, by the air mover control application program, an alert to a management application.

7. The information handling system of claim 1, wherein the interrupt handling operations include:
    sending, by the air mover control application program, an alert to a user of the air mover control application program.

8. The information handling system of claim 1, wherein the BIOS operations include storing the air mover data in a BIOS memory.

9. The information handling system of claim 8, wherein the BIOS memory comprises a system management BIOS (SMBIOS) memory including one or more data structures in compliance with a SMBIOS standard.

10. The information handling system of claim 1, wherein the event comprises an event-triggering parameter reaching a threshold defined by a user of the information handling system.

11. An interrupt handling method for processing air mover events, the interrupt handling method comprising:
    establishing a runtime execution of an operating system on an information handling system; and
    within the runtime execution of the operating system, performing interrupt handling operations comprising:
        detecting, with an air mover firmware executing on an embedded controller of an air mover integral to the information handling system, an event associated with a state or functionality of the air mover, wherein the detecting includes consulting a particular threshold to determine whether a number of events has occurred;
        responsive to the detecting, with the air mover firmware, the event, generating, by the air mover firmware, an interrupt corresponding to the event;
        providing an indication of the interrupt to a driver, wherein the driver comprises an interface between the air mover firmware and the operating system;

communicating a response to the air mover firmware from the driver to a basic input/output system (BIOS);

retrieving, by the BIOS, air mover data from the air mover firmware;

communicating the air mover data from the BIOS to the driver; and communicating the air mover data to an air mover control application program configured to take an action in accordance with the event.

12. The interrupt handling method of claim 11, wherein the interrupt comprises a system control interrupt.

13. The interrupt handling method of claim 11, wherein the event comprises a Windows Management Instrumentation event.

14. The interrupt handling method of claim 11, wherein the air mover firmware is configured to communicate the interrupt to the BIOS.

15. The interrupt handling method of claim 14, wherein the interrupt is an Advanced Configuration and Power Interface interrupt.

16. The interrupt handling method of claim 11, further comprising:

sending, by the air mover control application program, an alert to a management application.

17. The interrupt handling method of claim 11, further comprising:

alerting, by the air mover control application program, a user of the information handling system.

18. The interrupt handling method of claim 11, further comprising:

storing the air mover data in a BIOS memory.

19. The interrupt handling method of claim 18, wherein the BIOS memory comprises a system management BIOS (SMBIOS) memory in compliance with an SMBIOS standard.

20. The interrupt handling method of claim 18, wherein the event comprises particular parameter reaching a threshold defined by a user of the information handling system.

* * * * *